United States Patent [19]

Liu et al.

[11] Patent Number: 6,134,514

[45] Date of Patent: Oct. 17, 2000

[54] LARGE-SCALE NETWORK SIMULATION METHOD AND APPARATUS

[75] Inventors: Yu-Jih Liu, Wharton, N.J.; Chris Cho-Pin Li, New York; Victor S. Mordowitz, Monsey, both of N.Y.; Dimitris Protopapas, Huntington, Conn.

[73] Assignee: ITT Manufacturing Enterprises, Inc., Wilmington, Del.

[21] Appl. No.: 09/104,551

[22] Filed: Jun. 25, 1998

[51] Int. Cl.[7] .................................................. G06G 7/48
[52] U.S. Cl. .............................................. 703/17; 703/17
[58] Field of Search ..................... 395/500.27, 500.34, 395/500.44, 500.37, 706, 707; 455/67.1, 65, 506; 703/17, 27, 16

[56] References Cited

U.S. PATENT DOCUMENTS

| | | | |
|---|---|---|---|
| 5,375,074 | 12/1994 | Greenberg et al. | 364/578 |
| 5,440,719 | 8/1995 | Hanes et al. | 395/500 |
| 5,794,128 | 8/1998 | Brockel et al. | 455/67.1 |
| 5,828,867 | 10/1998 | Pennell | 395/500 |
| 5,832,272 | 11/1998 | Kalantery | 395/706 |
| 5,850,538 | 12/1998 | Steinman | 395/500 |
| 5,956,261 | 9/1999 | Blaauw et al. | 395/500 |

*Primary Examiner*—Kevin J. Teska
*Assistant Examiner*—Thai Phan
*Attorney, Agent, or Firm*—Saul Elbaum

[57] ABSTRACT

A distributed discrete-event simulation system operable for processing time-stamped events in chronological order for simulating a multinode communications network, the simulation system comprising a plurality of subsystem platforms (SPs) operable for transmitting message packets to other SPs for simulating node to node communications; and a system controller coupled via a communication link to the plurality of SPs for controlling synchronization and message packet processing associated with the plurality of SPs; wherein when a time-stamped event is received by one of the SPs, the receiving SP responsive to the time-stamped event triggers execution of tasks associated with the time-stamped event in the other SPs via the message packets to provide parallel task processing for the particular time-stamped event among the plurality of SPs.

36 Claims, 13 Drawing Sheets

LARGE-SCALE NETWORK SIMULATION METHOD AND APPARATUS

FIELD OF THE INVENTION

The invention relates to simulation systems and more particularly to distributed, discrete event simulation of computer communication networks.

BACKGROUND OF THE INVENTION

System simulation has been a very important "tool" in the design and the prediction of the performance of real systems. During the design phase, system simulation provides the means to study design tradeoffs and identify performance bottlenecks—thereby shaping the architecture and top-level design of the real system. During the post-design time frame, simulation serves to tune system performance through optimization of system configuration parameters and to identify potential design improvements. It, also, serves to generate performance predictions for new system applications prior to their implementation. The need for system simulation becomes imperative for complex systems where the risks of designing the "wrong" system become enormous. Large-scale computer networks (referred to, also, simply as networks) represent such complex systems and are today, one of the major applications of simulation. At the same time, the emergence of inexpensive computing power makes system simulations affordable.

Simulations can be classified into three types: continuous time, discrete time, and discrete event. The specific type of simulation described herein within the context of the present invention is known as discrete event simulation. That is, simulations where system state changes occur, in response to applied stimuli, at discrete points in time. Furthermore, the focus of discrete event simulation pertains particularly to distributed simulations in contrast to unistations/uniprocessor simulations. In the context of simulations, the term "unistation/uniprocessor" refers to the simulation environment associated with a single computer or work station, or a single processor of a multiprocessing system. In the foregoing description, such references pertain to work stations. Such descriptions regarding the latter applies to processors of a multiprocessing system as well. It should be understood that distributed simulations are simulation environments where the system at hand is partitioned into component submodels allocated to different computer workstations for execution. Distributed simulation has been studied extensively by industry and academia because of its promise to make possible (due to multiplication of computer resources) and/or practical (through faster execution) the simulation of large-scale systems.

Generally, distributed simulation necessitates that the cooperating workstations executing system submodels exchange time stamped event information; indicating at a minimum the next event each workstation is to execute as well as the scheduled time for the execution. Consequently, a workstation proceeds with execution of its next event when the latter becomes the smallest time stamp event in the collective list of pending events. This process prevents causality errors; that is, situations where execution of an event modifies state variables used by an event scheduled for execution earlier. However, distributed simulation using strict sequential order yields no gains in execution speed and is, therefore, not viable. Ideally, one would like the individual workstations to execute events in parallel in order to maximize the speedup factor. To this end, the prior art has been deploying two types of models for distributed simulation: (a) "optimistic" models, and (b) "conservative" models. Exemplary optimistic and conservative models are described by Fujimoto R. M. in "Parallel Discrete Event Simulation"; Communications of the ACM, October, 1990, incorporated herein by reference.

Optimistic models do not attempt to sequence the execution of events processed by different processors. Instead, such models allow each workstation to execute its own event sequence assuming independence among the events processed by the different workstations. At the same time, these models implement mechanisms for detection of causality errors and subsequent recovery through rollback.

Conservative models, on the other hand, are based on complete avoidance of causality errors by implementing lookahead algorithms that identify interdependencies among events executed by different workstations. Thus, such models allow processing of an event by a workstation, only when it is determined that the event in question will not be affected by the results of events that are currently being processed or are to be processed next by the rest of the workstations.

Most notable among the shortcomings of the optimistic approach are the processing overheads inherent in the model. Such overheads include: (a) those associated with the periodic saving of the state of each process (in order to make possible recovery of the simulation run when a causality error is detected), (b) the time wasted in incorrect processing while heading for a causality error, and (c) the time required to rollback, undo the "thus far event processing", and reprocess events. Such overheads may nullify parallel processing benefits or lead to mediocre speedup gains. Other shortcomings include the fact that the required detection and rollback mechanisms are very complex and difficult to implement, as well as the fact that "erroneous processing" (while heading for a causality error) may lead to infinite loops.

Conservative models, while not incurring the aforementioned overheads and instabilities, do, however, require efficient lookahead algorithms that identify and exploit event parallelism in order to achieve good performance. This is a serious problem considering that: (a) many applications do not allow the development of such efficient algorithms, and (b) even when they do, such applications may be highly dependent on the "constants" of the specific simulation experiment. Another problem concerns the fact that users need to possess detailed knowledge of the deployed event synchronization scheme, so that they can "tune" the model for the particular application/experiment being simulated.

Another shortcoming, common to both classes of models, is their reliance on special (as opposed to commercial off-the-shelf) software developed for specialized research or applications programs.

Finally, it is noted that in the case of distributed simulation of large-scale communication networks, existing models are forced to limit themselves to specific configurations and to incorporate simplifying assumptions in order to make practical the simulation of such large networks.

SUMMARY OF THE INVENTION

A distributed discrete event simulation system operable for processing time-stamped events in chronological order for simulating a multinode communications network, the simulation system comprising a plurality of subsystem platforms (SPs), each SP including a subset of active nodes for originating and transmitting message packets to other nodes and proxy nodes operable as repeaters of the transmitted message packets for the simulated multinode communications network, and a system controller coupled via a communication link of the simulated network to the plurality of SPs for controlling synchronization and message processing associated with the plurality of SPs, wherein a time stamped event for execution is received by one of the SPs, and wherein the receiving SP responsive to the time-stamped event triggers execution of tasks associated with the time-stamped event in the other SPs via message packets from the active and proxy nodes, such that parallel task processing for the particular time-stamped event occurs among the plurality of SPs.

DETAILED DESCRIPTION OF THE INVENTION

Before embarking on a detailed discussion, the following should be understood. The presently described simulation system differs from the prior art distributed simulation models in that it does not rely on parallel execution of time stamped events for speed. Instead, it speeds up simulations by executing in different workstations parallelizable tasks of the same event. That is, when a workstation starts processing of a new time stamped event, it uses the physical network that serves for time stamped event exchanges among workstations to trigger execution of other tasks associated with this event in the rest of the workstations. To this end, workstations use background packet communications (as opposed to simulation language directives). Therefore, while the "origins" and "destinations" of the packets are simulation activities, they are otherwise invisible to the simulation processes.

It can be seen that since the simulation system of the present invention does not rely on parallel execution of time stamped events, the latter can be processed in strict chronological order. Thus, the new model is neither optimistic nor conservative—it represents, in itself, a new class of distributed simulation models. Consequently, it does not have the overhead and complexity shortcomings of the optimistic class; nor the lookahead algorithm needs and application/experiment dependencies of the conservative models.

It is noted that, in general, the parallelizability of the tasks associated with the execution of an event is application dependent. However, when it comes to simulations of large-scale, any-node-to-any-node wireless communication networks, such as a wide-band digital radio network (which is the target application of the developed model) most events do involve parallelizable tasks.

The simulation system of the present invention includes a commercial off-the-shelf (COTS) network simulation tool suite—which generates the time stamped events with no additional user effort. Thus, the presently described simulation system relies largely on off-the-shelf simulation tools—thereby eliminating another serious shortcoming of existing models.

Finally, unlike the existing models, the present system model does not require simplifying assumptions in order to make possible the design of lookahead or causality error detection/recovery algorithms. Such simplifications would compromise the accuracy of the simulation results in addition to the extra effort required to change the network model run on a unistation.

Architecture

Figure 1:
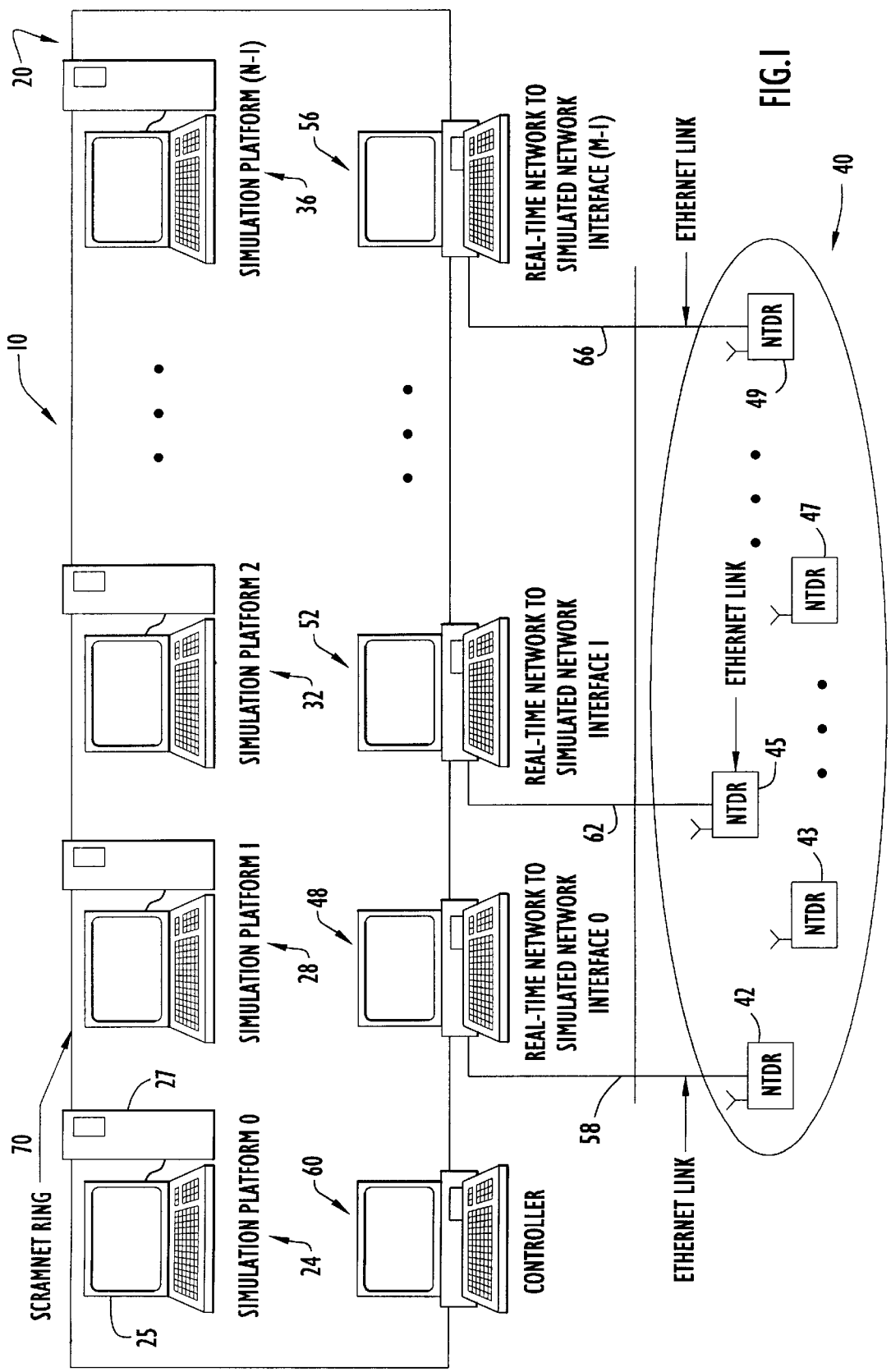
FIG. 1 is an illustration of the overall architecture of the distributed simulation system according to the present invention.

Referring now to FIG. 1 there is depicted the overall unified architecture 10 of the distributed simulation system 20 according to the present invention, including a real network 40 to which the simulation system is connected. The system consists of:

N Simulating Platforms (SPs) 24,28 . . . 36, each comprising a workstation 25 and memory storage unit 27 (e.g. file server) executing component submodels of the simulated network;

M platforms serving as Real/Simulated Network Interfaces (RSNIs) 48, 52, . . . 56 connecting to nodes of the real network through ethernet interfaces 58, 62, . . . 66, and One platform serving as synchronization controller 60 for all of the N+M platforms. In the particular embodiment, all SPs 24 are SPARC workstations, and the system controller 60 and RSNI 48 are PCS. Preferably, each of the SPARCs runs under the SOLARIS operating system, while the PCs operate under the NT operating system.

Each of the platforms 24,48,60 are interconnected in a ring-like by communication link 70. Preferably, this connection is made by means of COTS fiber optic links terminated at both ends on circuit cards plugging into the respective platforms which can be up to 3.5 Km away from each other. Link transmission speeds are up to 150 Mbit/sec. Note that the use of fiber optic cable achieves two important goals: first, it minimizes the transmission delay between work stations because of its high band-width, and; second, it allows a large number of work stations to be interconnected due to its high noise immunity.

The platforms utilize a shared-memory approach for communication with each other. The conventional communication link preferably employed is "SCRAMNet(™) (standing for Shared Common RAM Network). Each platform is assigned its own message address space in memory 27 such that when a message destined for it arrives, the processor of the destination platform is interrupted. However, a platform always retransmits the received message to its neighboring station (i.e. platform) on the communications link until the message completes its trip around the ring and returns to its originator. The inter-platform packet transmissions are accomplished by a parser resident on each platform for first decomposing the original packet into individual fields; then, transmitting all fields; and, finally, reassembling all fields into the original packet at the destination. As is well known, SCRAMNet protocol is a light one involving very low overhead.

In summary then, communication among work stations is achieved through SCRAMNet, which utilizes the shared memory concept for data transmission. When a source station wishes to transmit, the station simply writes the data to a common shared memory. The data then circulates along the ring from one station to the next. The other station which receives the data, puts the data into that station's own shared memory corresponding to the same physical location of the source station. The designated station may also be interrupted to receive the data. The interrupt bit may be transmitted as a data bit. If the shared memory of the receiving station is set up to receive interrupts, the host may be interrupted immediately to process the incoming data. For those work stations which are not the destination, they simply receive data from the previous work station and relay them to the next work station.

Keys to the effectiveness of the shown architecture 10 are the use of COTS platforms and a high speed medium allowing very fast transfers of time-stamped event information and background communication packets among the platforms. Furthermore, the deployed architecture is transparent to the specific manufacturer and/or model of the platforms, and/or the particular operating system deployed in each such platform (for example NT vs. SOLARIS).

The system controller 60 operates to synchronize event executional processing by all participating SPs 24. The system controller also gathers statistics and includes a graphical user interface to a user for network monitoring.

Figure 2:
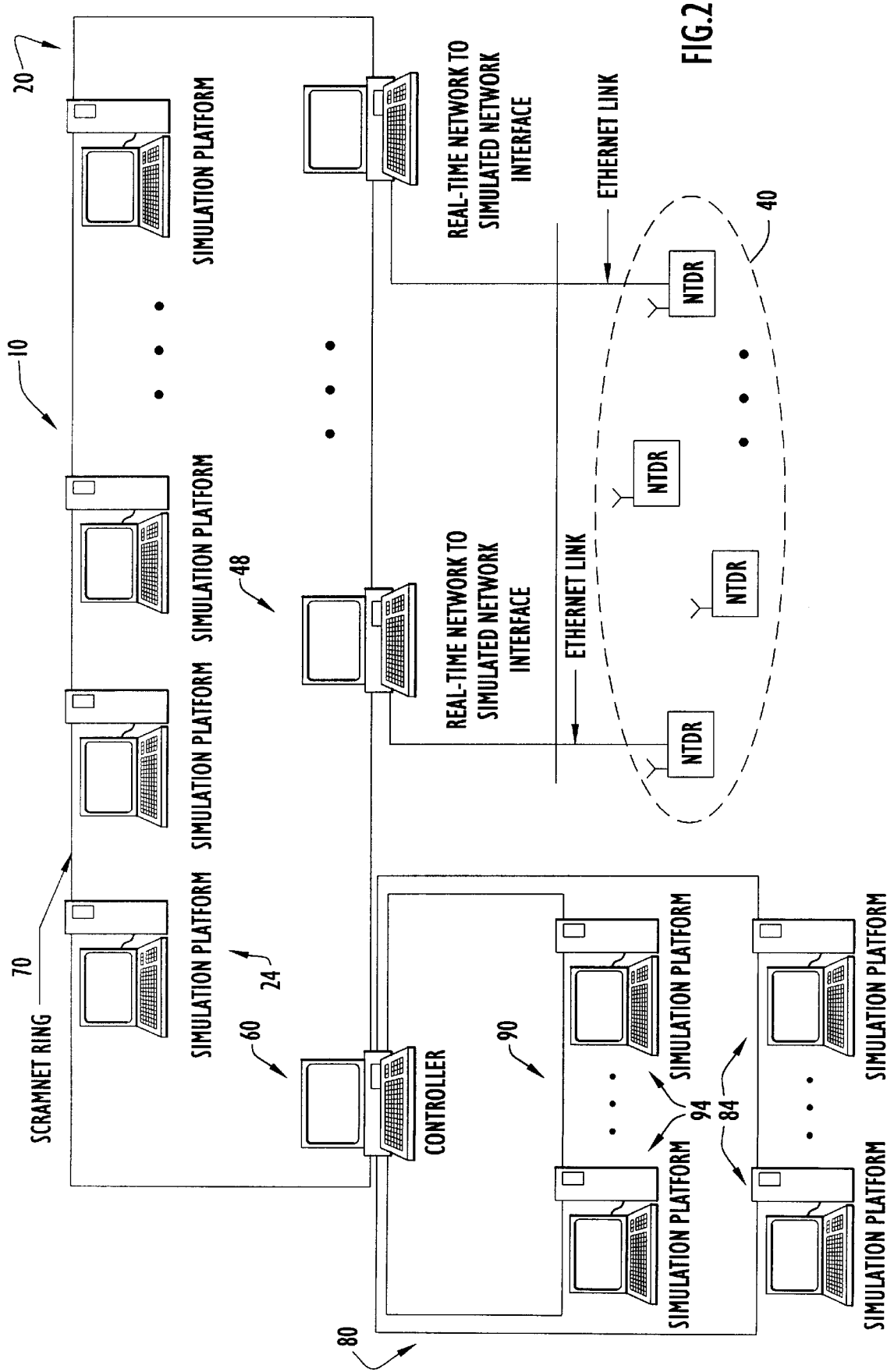
FIG. 2 is a schematic of an extended architecture including a plurality of simulation communication links for a distributed simulation system according to the present invention.

The system may be extended further through implementation of additional simulation rings as illustrated in FIG. 2.

FIG. 2 shows an extended architecture of the distributed simulation system comprising a first ring 70 interconnecting simulation platforms 22, real time network interfaces 48, and controller 60 with one another. While simulation ring 80 connects simulation platforms 84 with sync controller 60. In similar fashion, simulation ring 90 couples simulation platforms 94 with the sync controller to obtain the distributed simulation system.

A simulation tool is installed on each of the SP units for providing message communications. In the preferred embodiment, the simulation tool deployed is OPNET- a commercially available discrete event simulation tool suite intended for communication networks in general. The OPNET product provides visualization of communication devices, transmission links and protocols being simulated through a graphical user interface (GUI) and allows easy extraction of network performance measures.

Note that the constructed distributed simulation system 20 may be integrated with a real network 40, such as an NTDR radio network, as shown in FIG. 1; so, that the described invention is applied to the combined simulated/real network.

The subsections that follow describe the overall architecture of the constructed distributed simulation system, the nodal model used for simulation of the NTDR radio, and the method devised for partitioning of the simulated network into component models run on separate workstations. It is the partitioning process that brings the described invention into play. Subsequent subsections describe the scheme used to synchronize the simulating workstations and the subsystem serving as an interface between the simulated network and the "real" network.

Node Model

To better understand the invention, it is useful to center the description around a specific example. In a particular embodiment, the network to which the invention is applied is a large scale 1000 node network using as network nodes the NTDR radio manufactured by ITT Corporation, the assignee herein. The NTDR radio is a wide-band radio IP router device developed by ITT for the U.S. government. Note further that in the particular embodiment shown in FIG. 1, real network 40 comprises a real NTDR network for combination with the simulated network 20.

As is well known, NTDR radios self-organize into node "clusters" using as a criterion communication proximity. That is, the power of the communication signals received from all of its neighbors. A cluster constitutes a broadcast subnetwork where nodes can communicate with each other directly and can hear each others transmissions, while transmissions to nodes belonging to other clusters of the overall network are accomplished via the respective cluster heads. The cluster is also very similar to the cell of a cellular telephone network, while the cluster head is similar to a base station in a cellular cell. A cluster head is the node that has full connectivity to the rest of the members of a cluster so that it can receive all of their transmissions. The cluster head serves all intercluster communications. That is, all messages destined for nodes outside of this cluster, are transmitted via the clusterhead.

The implications of the aforementioned self-organizing characteristics for the network model, is that prior to self-organizing, each NTDR must attempt to communicate with all other NTDRs of the network. Only then, can it determine which of the NTDRs are considered "neighbors". In fact, in a dynamic (mobile) environment, where neighbors keep changing, any-node-to-any-node communication must occur all the time in order to update the list of neighbors.

Note that, for every user packet transmission, there are exchanges of four different packets. First is the utilization of a reservation channel and a CSMA algorithm to make sure the channel is free. To accomplish this, the source sends out an RTS (request to send) to the receiver. If the receiver responds with a CTS (clear to send) the data channel is available. Upon obtaining the data channel, the data packet is transmitted. Upon receiving the data packet, the receiver also sends an acknowledgment packet to the source. A complete protocol stack is implemented using OPNET. The protocol follows the OSI layered architecture. The upper layer is specified by the standard TCP, UDP, and IP. The intranet layer is responsible for routing within the network, cluster formation, and maintenance. The link layer is responsible for message queuing, acknowledgment, and re-transmission. The physical layer is responsible for message transmission and reception for all three radio channels.

Figure 3:
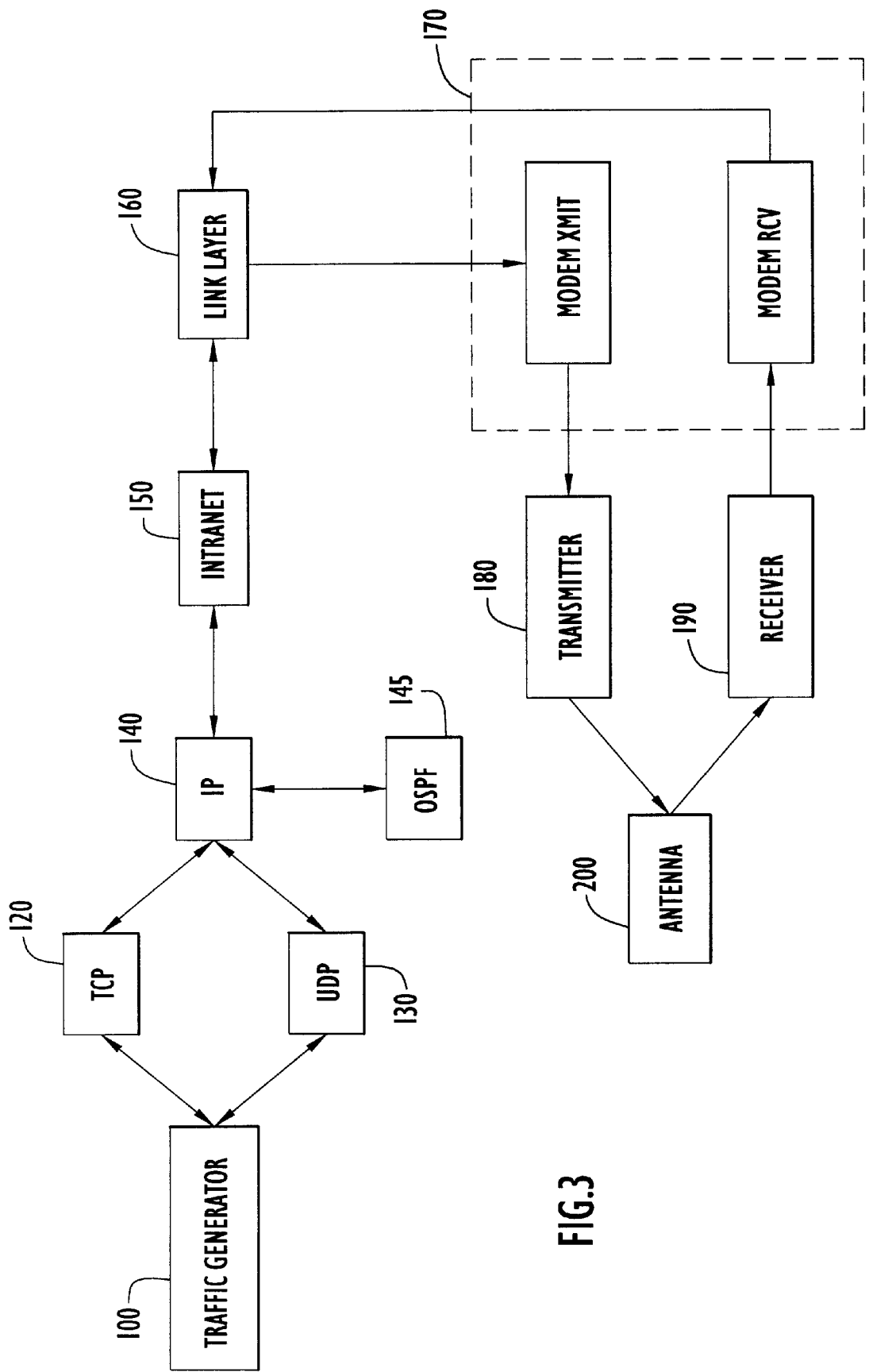
FIG. 3 is a nodal representation of an NTDR radio network model operable in a single work station.

FIG. 3 shows a simplified form of the nodal model of an NTDR when running a network model in a unistation. The traffic generator 100 generates data packets 110 which, in turn, traverse the UDP 130 (or TCP 120), IP 140, intranet 150, and link layer 160 to reach modem processor 170. The latter either sends a packet to the transmitter 180 for transmission, or, receives a packet from the receiver 190. Intranet 150 and OSPF 145 protocols serve intra network and inter-network routing purposes, respectively. With the exception of intranet and link protocols which are NTDR-specific, all other protocols are from the standard TCP/IP protocol suite.

Figure 4:
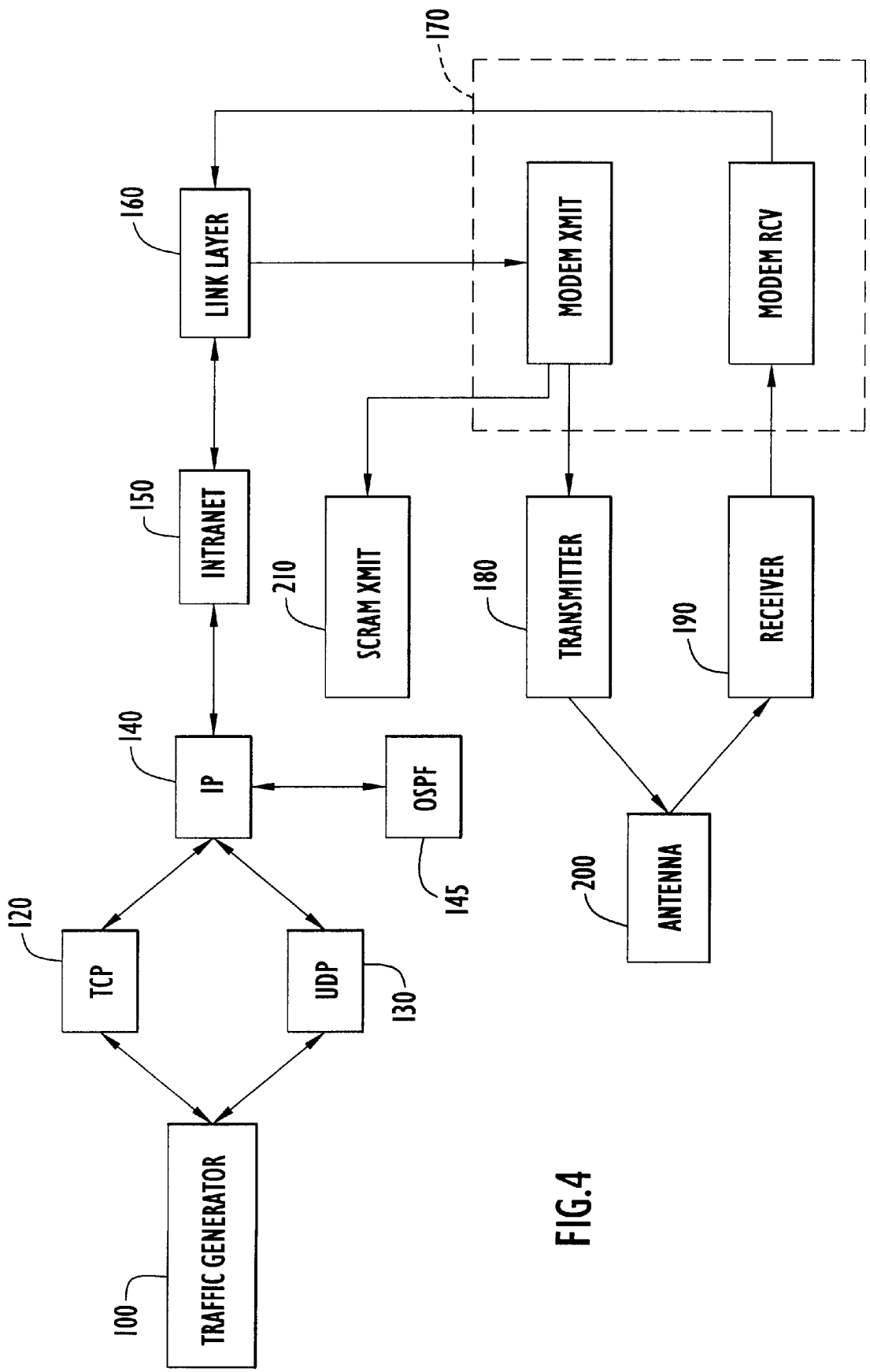
FIG. 4 is a nodal model of an NTDR radio network multiplatform system according to the present invention.

FIG. 4 shows the simplified NTDR nodal model when running the network model in the distributed simulation system. As one can ascertain, the difference from the previous model is that, in addition to being sent to the antenna 200, outgoing packets are also sent to a SCRAMNet transmission module 210. The SCRAMNet module decomposes a packet into individual fields prior to transmitting them over the SCRAMNet transmission link (i.e. 70 in FIG. 1).

Network Partitioning

The fact that cluster formations and memberships change on an on-going basis complicates network partitioning. For example, since clusters are ephemeral, the overall network cannot be partitioned (for assignment to SPs) across cluster boundaries. Doing so would require migration of NTDR nodes from one SP to other SPs in the course of a simulation experiment.

This fundamental problem is solved by introducing the concept of "proxy nodes". To explain the latter, one may assume that the network to be simulated has a total of n nodes and that it is partitioned such that the portion assigned to station k (where k=1,2, . . . N) consists of $n_k$ nodes (to be referred to from here on, as "active nodes"). This means that $n-n_k$ active nodes reside in the remaining N−1 SPs. Then, introduced in station k, proxy representations of the $n-n_k$ missing nodes; such that the total of active plus proxy nodes per SP is always n.

Now, it is further assumed that one of the active nodes residing in station k, say node j, initiates transmission of a packet. As explained in FIG. 4 above, the packet is: (a) transmitted through the transmitter of the source node to the rest of the active nodes of station k, and (b) transmitted through the SCRAMNet module to the N−1 proxy images of node j, the latter being residing in the remaining N−1 SPs. Subsequently, each of the proxy nodes transmits the received packet to all active nodes of the respective SP. That is, proxy nodes are acting as representatives of the active source node in the rest of the SPs.

As a result of the described procedure all N workstations work in parallel to process the event associated with transmission of the original packet sent by node j to the remaining n−1 nodes of the simulated network. That is, even though the original n nodes are distributed among N workstations, they operate as if executing a simulation in a single workstation. Hence, the devised procedure accomplishes both parallelism of the tasks associated with an event and a solution to the partitioning problem.

Figure 5:
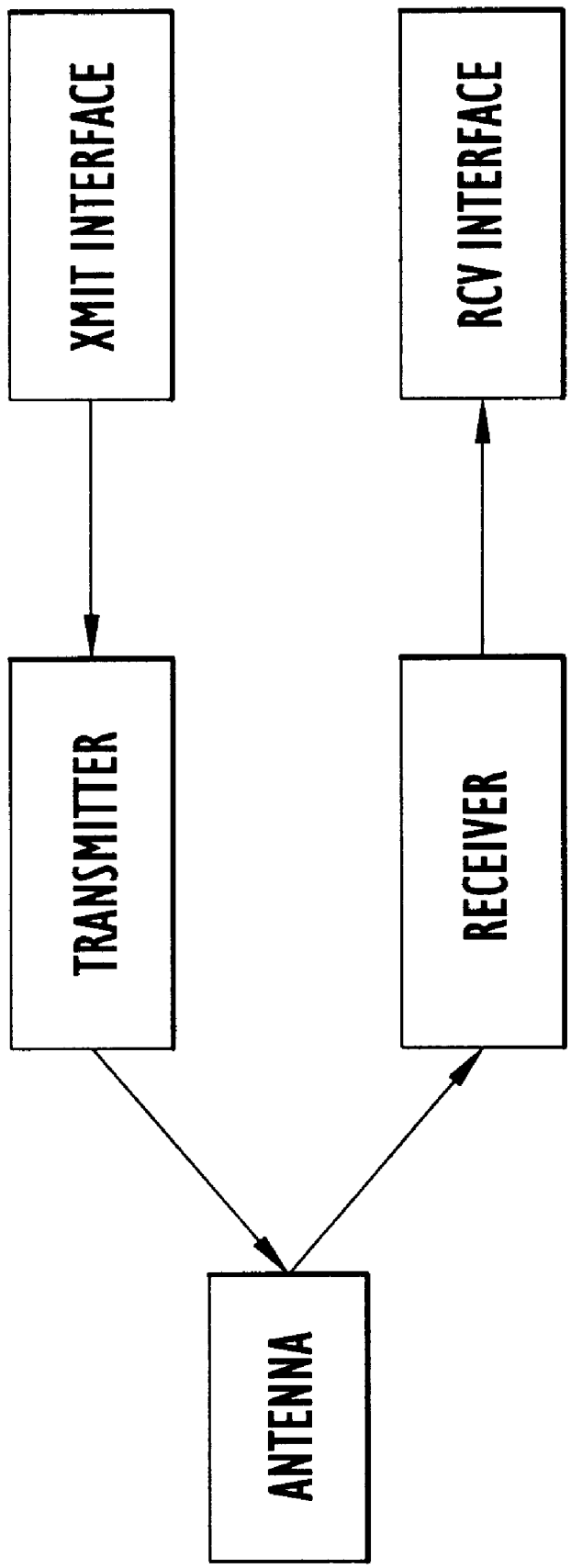
FIG. 5 is a schematic representation of a proxy node.

The proxy node model as shown in FIG. 5, represents a modified version of the active node one, as it only needs to act as a repeater of the respective active node at the physical layer. It does not need the functionality of the remaining protocol layers, or, the capability to receive packets from any other node.

Synchronization

Event synchronization is critical in wireless, any-node-to-any-node communication networks, where nodes must maintain an accurate RF environment across multiple SPs. The timing for events occurring in one SP must be synchronized with events occurring in other SPs. In other words, simulated radio nodes could not function properly if the execution of events related to radio transmission and reception in each of the SPs is not synchronized with each other. Note that a similar problem also occurs in point-to-point networks, however the impact on the simulation result is not as severe. Note further that, in an OPNET simulation model, simulation nodes essentially consist of different state machines. Each of these state machines is driven by events, where the change of the state of these machines involves execution of various functions and the advancing of a simulation clock. Since all future simulation events are stored in an event list and forwarded in an ascending order of simulation time, the pace of the execution of the simulation events can be regulated by manipulating the events in the event list.

Figure 7:
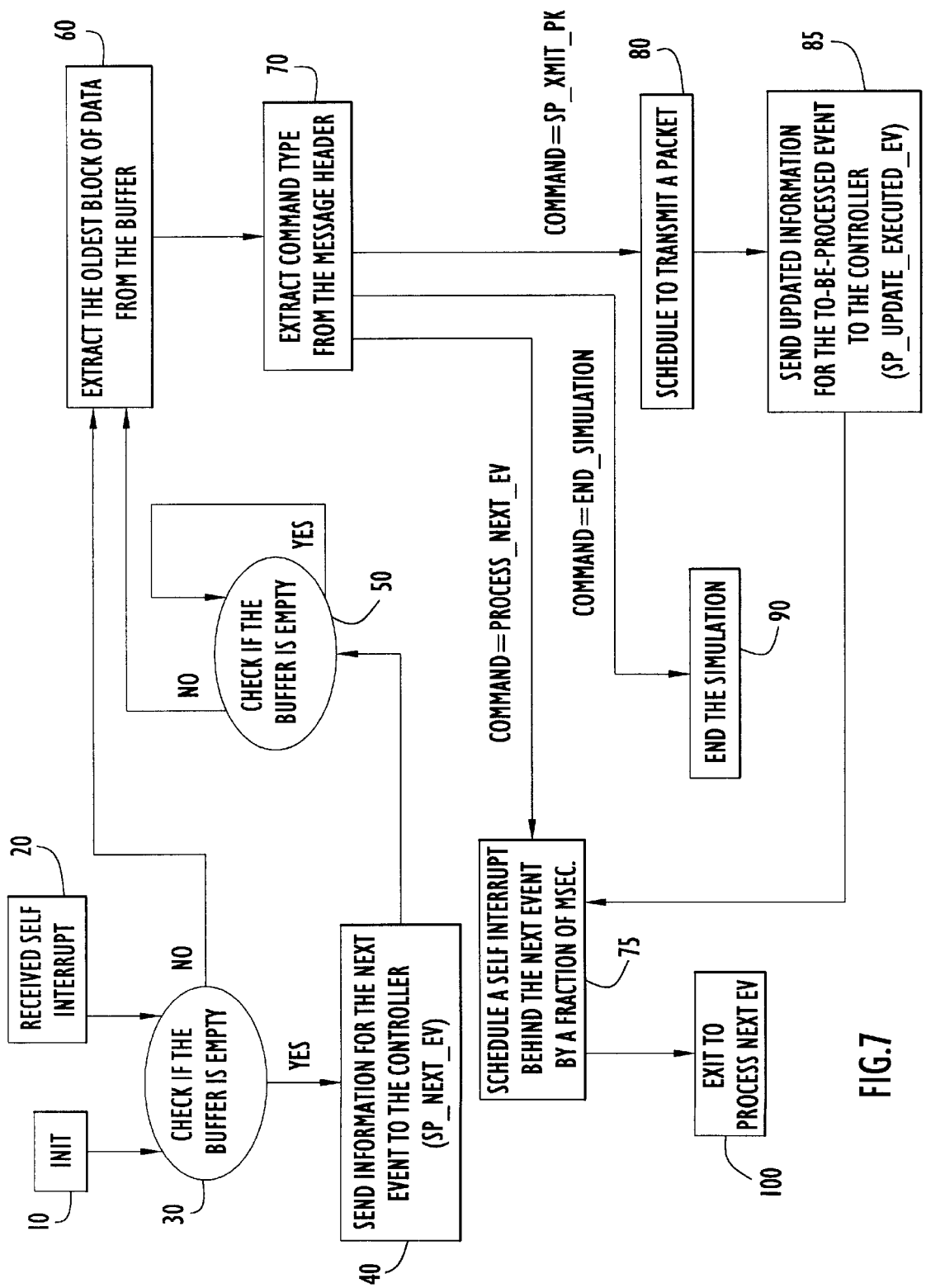
FIG. 7 represents a detailed flow chart based on FIG. 11 of the SP synchronizer according to the present invention.
Figure 9:
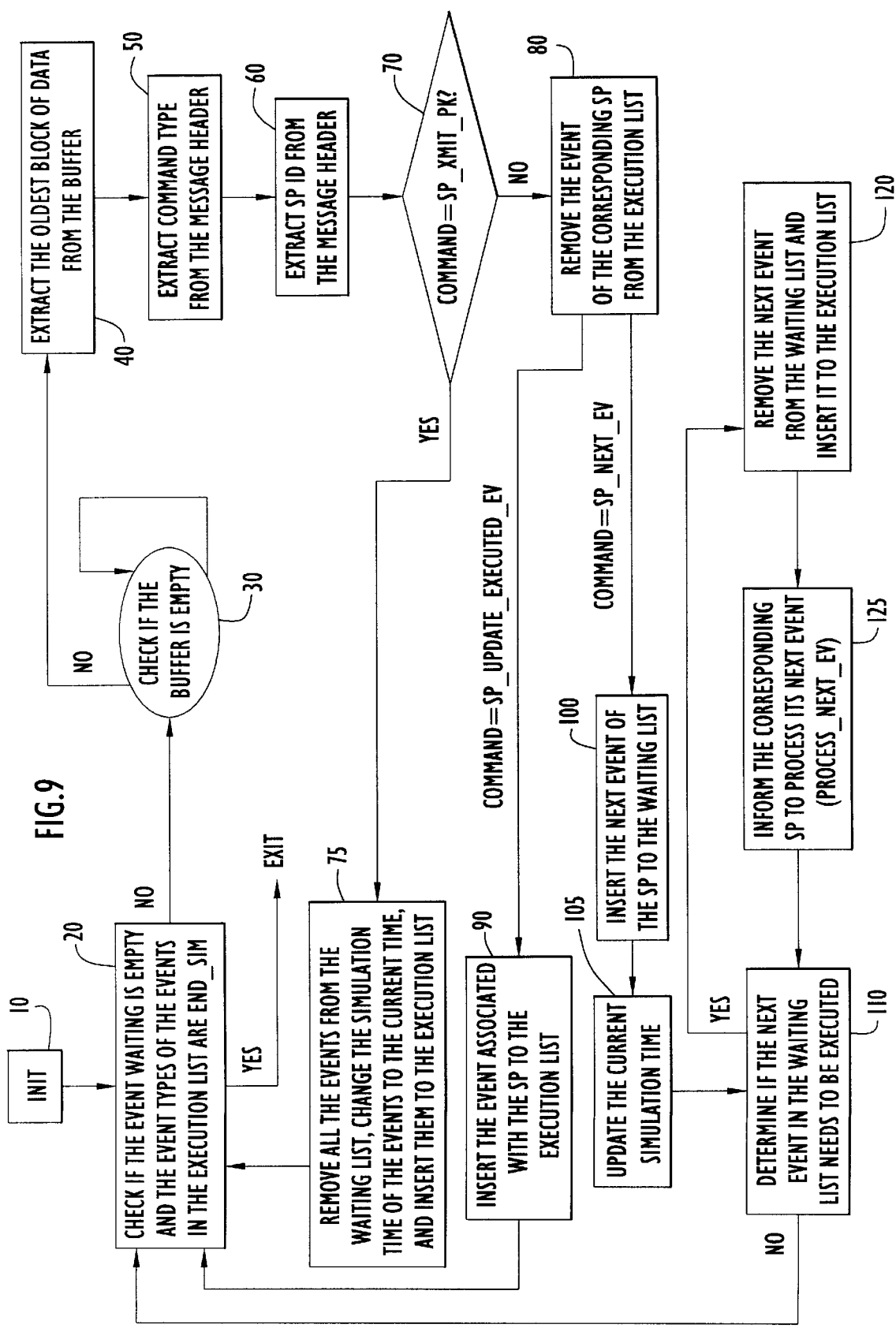
FIG. 9 is a detailed flow chart based on FIG. 12 and illustrative of the system controller synchronizer according to the present invention.
Figure 11:
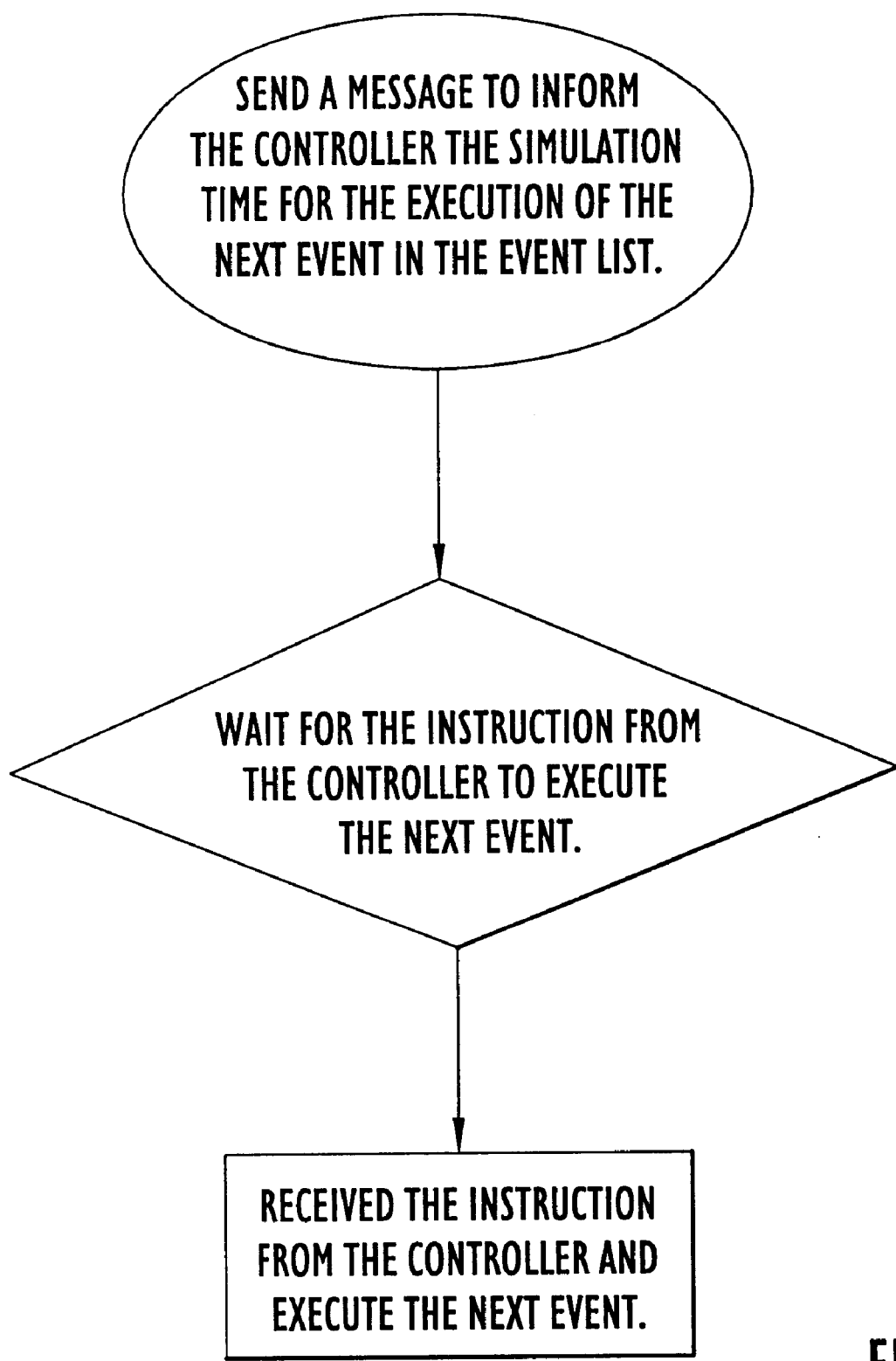
FIG. 11 is a high level flow chart of the SP synchronizer according to the present invention.
Figure 12:
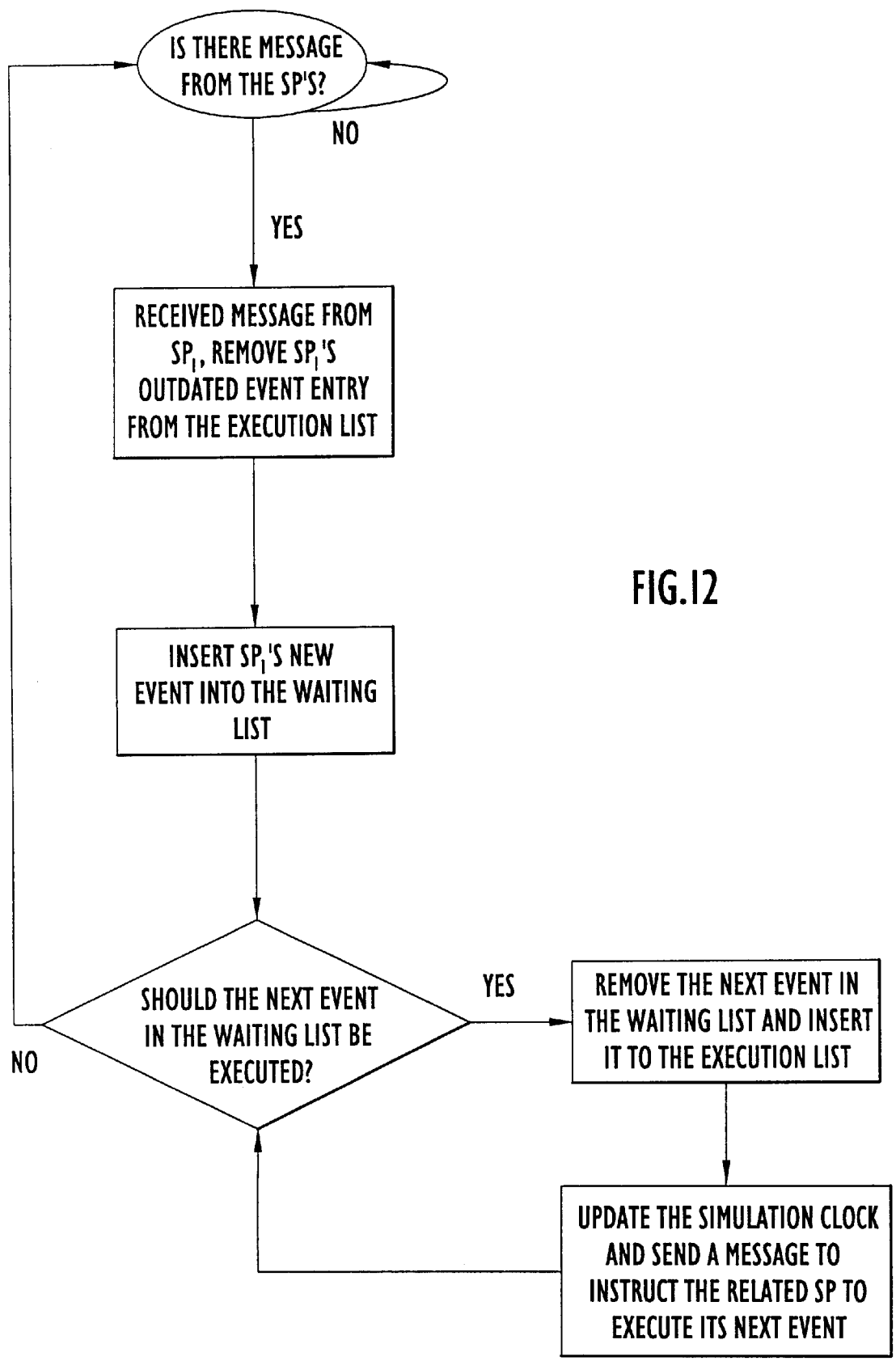
FIG. 12 is a high level flow chart of the system controller synchronizer according to the present invention.

As one can ascertain, during the course of a simulation run, the SPs and the controller communicate with each other through messages sent across the fiber optic ring. In general, there are two types of messages: a) messages from a SP to inform the controller that it is ready to execute the next event on its event list, and b) messages from the controller to instruct an SP to execute the next event in its event list. This necessitates proper synchronization among events processed by different SP. To this end, each SP and the system controller includes a synchronizer feature for achieving synchronization. A high level flow chart depicting the operation of the synchronizer module in each of the SPs is depicted in FIG. 11, while FIG. 12 depicts the high level flow chart for the synchronizer module in the system controller. FIGS. 7 and 9 respectively, represent detailed flow charts of the SPs and system controller synchronizer modules and their operation.

SP Synchronizer

Each of the SPs includes a synchronizer feature which capitalizes on event scheduling information provided by OPNET at each SP, and interacts with a synchronizer of the system controller 60 to ensure that events at its host SP are processed at the right times. The key functions performed by each SP synchronizer include:

identification of the event to be executed next at the respective host SP;

insertion of a "synchronization event" into the SP's simulation event list, such that, control of the simulation will return to the SP synchronizer at the time specified by the synchronization event;

transmission of information on the next event scheduled for processing at the respective SP, to the system controller; and execution of commands and processing of information received from the system controller, as well as from other SPs.

Figure 6:
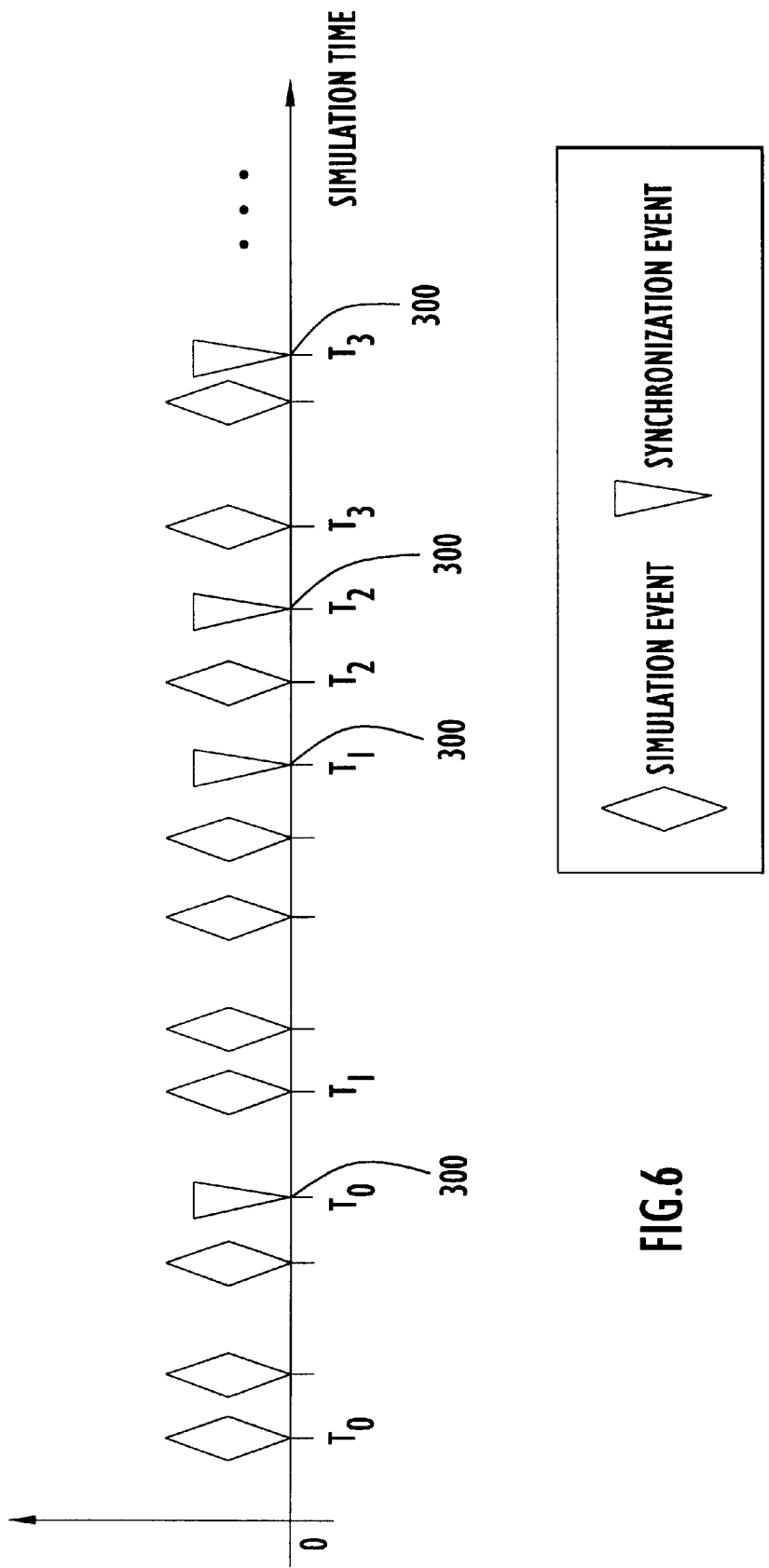
FIG. 6 is a schematic representation of an event list at a subsystem platform according to the present invention.

It is noted that identification of the event to be executed next is determined in a straightforward manner through the OPNET simulation kernel. FIG. 6 illustrates an exemplary event list of a simulation run with synchronization events 300 inserted to control the pace of simulation event processing in the host SP. Note that, typically, there is more than one event scheduled for processing at a particular SP at any particular time. Such are events whose results are not dependent on events running in other SPs. For example, in FIG. 6 four simulation events are scheduled for processing at time t1.

A flowchart illustration of the operation of the SP synchronizer is provided in FIG. 7. Referring now to FIG. 7, when an SP completes initialization, control of the simulation to the SP synchronizer is returned. This is accomplished by the kernel at startup time, after the simulation run in the SP completes its initialization. Initialization is depicted as module 10, while control is returned via the interrupt module 20. The SCRAMNet incoming message buffer is then sampled (module 30). If there are no messages in the buffer, processing proceeds to module 40 where sampling from the event list of the host SP determines which event is scheduled for processing next. The information for the next event is then sent to the system controller and the incoming message buffer is again checked to determine the existence of any new messages input from the SCRAMNet communication link (module 50). If no incoming messages exist in the message buffer, then processing continues by periodically sampling the incoming message buffer until a message appears. As shown in module 60, when the checked buffer is no longer empty, the oldest message resident in the buffer is retrieved. As shown in module 70, the message is parsed to obtain the message header and the command type field within the message header is determined. If the SP synchronizer determines that the command is to process the next event, then a synchronization event (module 100) is inserted temporally, immediately behind the "next event". The synchronization process then exits (module 105) and control is released back to the kernel.

If the scheduled packet transmission command type was detected in the message header (from module 70) the synchronizer schedules transmission of a packet by the respective proxy node corresponding to this particular SP, as indicated in module 80. Updated information for the next-to-be executed event in the event list is then sent to the system controller, as shown in step 85. Module 85 then calls module 100 so that a synchronization event is then started behind the updated event and control is released to the kernel.

Finally, if an end simulation (END_SIMULATION) is received in the message header, the simulation run is terminated and the processing ceases (module 90). When the kernel regains control of the processing, the kernel begins sequentially executing the listed events in this SP in chronological order until a synchronization event is encountered. Upon detection of a synchronization event, the kernel releases control back to the synchronizer and the processing beginning in module 30 is repeated.

System Controller Synchronizer

Figure 8:
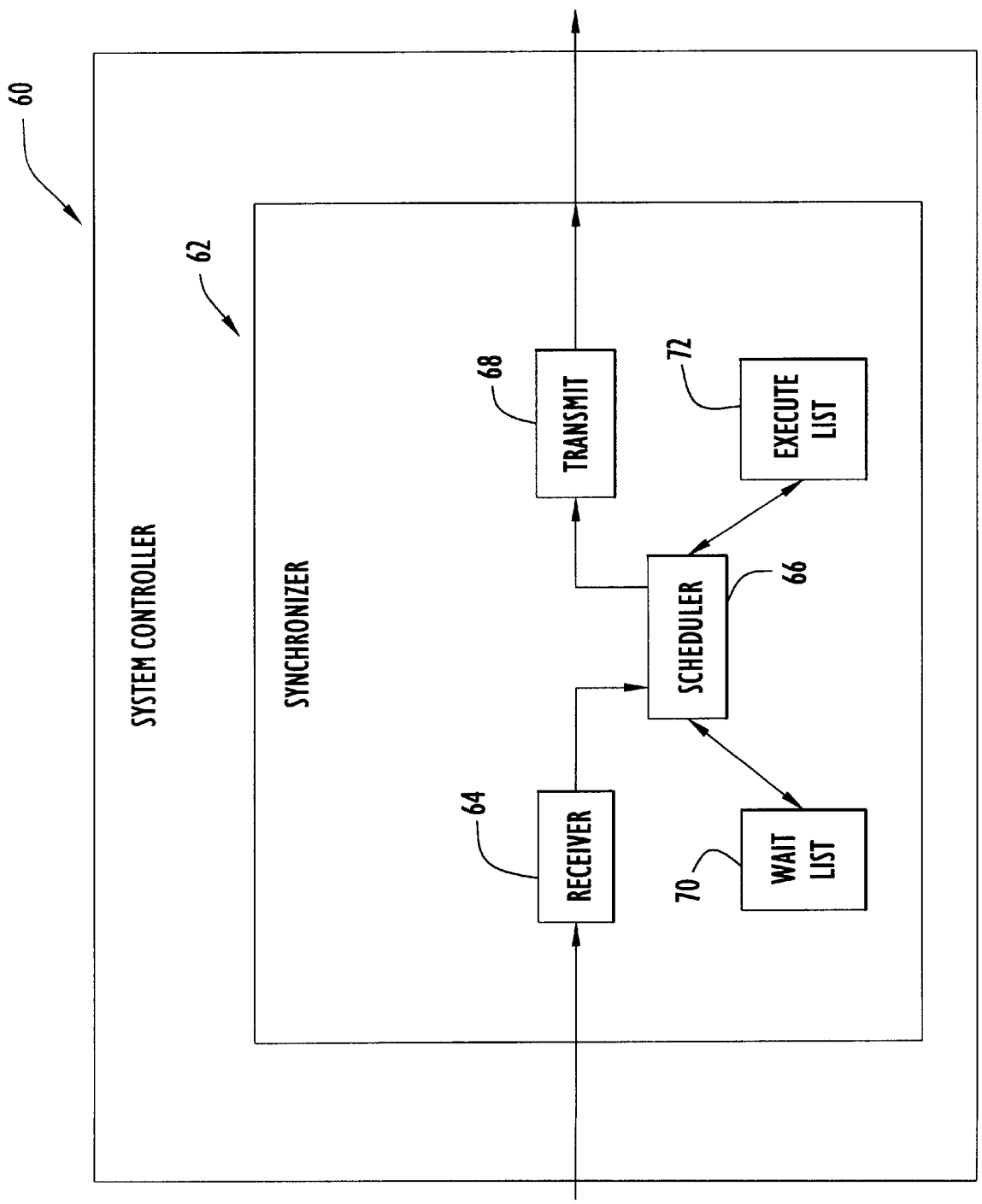
FIG. 8 is a schematic block diagram of the SP synchronizer according to the present invention.

Referring now to FIGS. 8 and 9, there are shown a schematic block diagram and flow chart, respectively, of the system controller synchronizer feature according to the present invention. Referring to FIG. 8, the synchronizer 62 of system controller 60 includes a receiver feature 64 for reception of information on the event to be executed next at each SP, a scheduler 66 operable for ordering of event information received from all of the SPs in time, and for determining which event should be processed next, and a transmit feature 68 for notifying the respective SP to proceed and process the next event. The system controller synchronizer 62 also maintains two event lists; (a) a waiting list 70 containing events to be processed by different SPs, and (b) an execution list 72 containing events that are currently being processed by the SPs. The maximum number of events contained in either list at any point in time is N; where N represents the total number of SPs in the distributed simulation system. The flow chart of FIG. 9 illustrates the operation of the system controller synchronizer.

Figure 13:
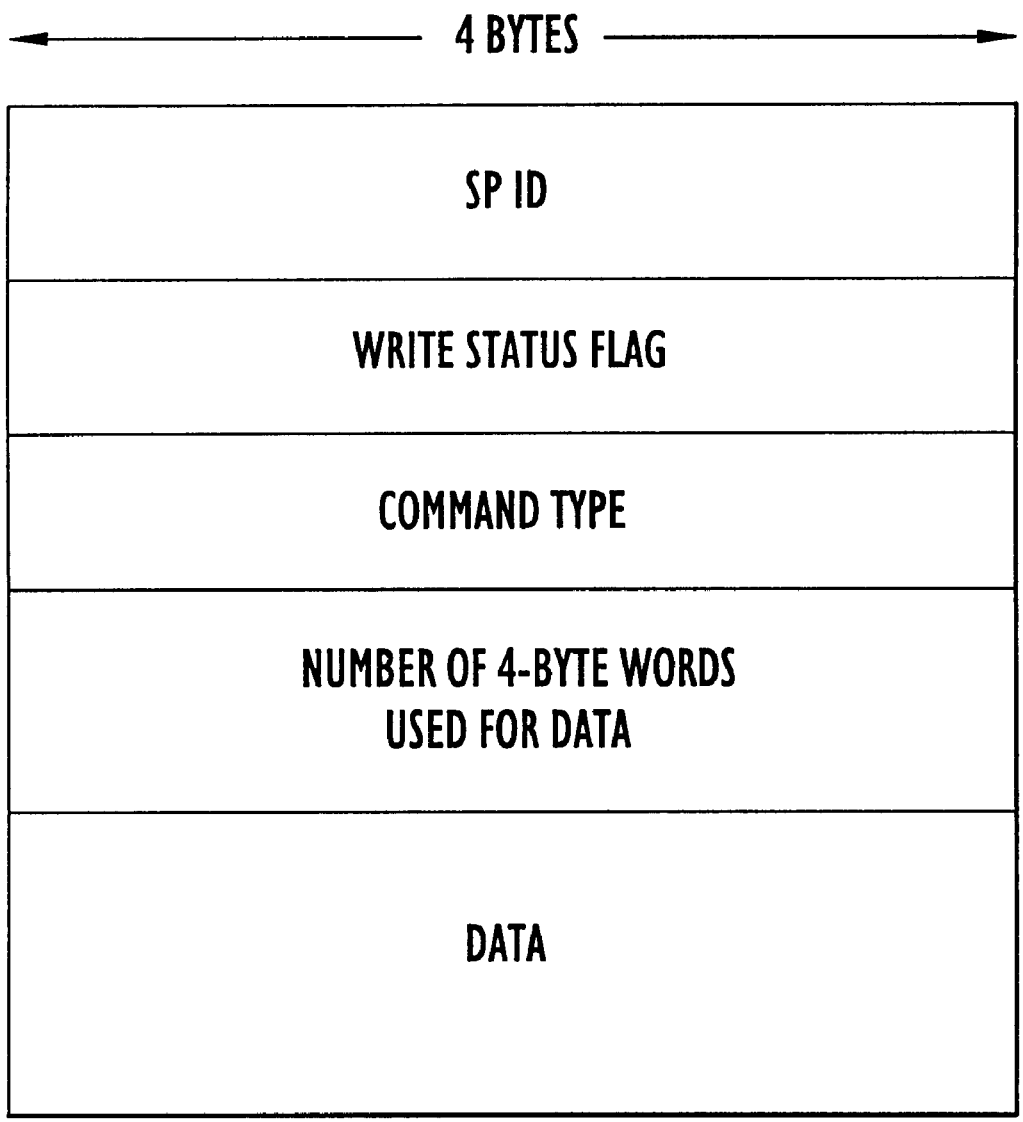
FIG. 13 illustrates the format of a transmitted message for communication among SPs and the system controller according to the present invention.

Referring now to FIG. 9, the synchronizer is initialized in step 10. Initialization includes preparation of a waiting list of N (1 per SP) events, which includes identifiers (IDs) of the respective SPs and the event type (e.g. begin simulation BEGIN_SIM). The simulation time is set to 0. The waiting list is then checked (module 20). If the waiting list is empty, and the event type for all events listed in the execution list is END_SIM, then the process exits. Synchronization then terminates. If however, either the waiting list is not empty or the event type for all events listed in the execution list is not END_SIM, then processing proceeds to module 30 where the sync controller synchronizer checks the SCRAMNet message buffer to determine if any input message has been received over the network. If the buffer is empty, the sync controller periodically samples the buffer until a message is detected. If the buffer is not empty, or when a message is received, the oldest message in the buffer (i.e., oldest block of data) based on the time-stamp of the message is extracted (module 40). The message is parsed and the command type field located within the message header is extracted (module 50). The ID of the SP which sent this message is also obtained from the message header (module 60). A message 90 of this format is depicted in FIG. 13. This is simply a time reference kept by the controller. It is set by the controller to be equal to the simulation time of the event currently at the head of the execution list when the latter is non-empty. Else, it is set equal to the simulation time of the event currently at the head of the waiting list. The command type field is then compared to the possible list of received command types. If the command SP_XMIT_PK is received (module 70) indicative of a command to transmit a packet, then the simulation time associated with all events of that SP currently held in the waiting list are changed to the current simulation time, according to an internal clock associated with the system controller. These events are then removed from the waiting list and inserted into the execution list as indicated in module 75.

Processing again continues with module 20 where the synchronizer samples the event waiting list and the execution list for entries and event types respectively. If however, the command type extracted from the message header in module 50 is not SP_TRANSMIT_PK, then the event associated with the sending SP is removed from the execution list as shown in module 80. If the command type is SP_UPDATE_EXECUTED_EV indicative of a request to update an executed event, then the sync controller operates to insert the event imbedded with the message and associated with the particular SP into the execution list (module 90). Upon completion, processing then again returns to module 20. On the other hand, if the received command type is SP_NEXT_EV, then the next event associated with the SP and embedded in the message is inserted into the waiting list (module 100) and the current simulation time is updated as shown in module 105. No system clock is utilized. However, when the entire distributed simulation system is initialized at the beginning of a simulation experiment, the OPNET simulation tool suite establishes a common simulation time for all SPs. The synchronizer then determines if the event at the head of the waiting list (i.e. the next event) should be executed as shown in module 110. The only criterion is that the scheduled simulation time of the event at the top of the waiting list is equal to the current simulation time. If the next event is to be executed, processing proceeds to module 120 which removes the next event from the waiting list and inserts the event into the execution list. The message is then transmitted over the communication link to inform the corresponding SP to process its next event (i.e. scheduler sends a PROCESS_NEXT_EV message) indicated in module 125. Control again returns to module 110 to determine whether or not the next event in the waiting list should be executed. When the determination is made by the synchronizer that the next event not be executed, control returns to module 20 and the process is at repeated.

Note that the updating of the current simulation time, referenced in module 105, is accomplished as follows: if the execution list is non-empty, the current simulation time is set to the simulation time associated with the event currently at the head of the execution list. Otherwise, the current simulation time is set to the simulation time associated with the event currently at the head of the waiting list.

The criterion for determining whether or not the event at the head of the waiting list is to be executed next, in module 110, depends on the entities being synchronized. If the synchronization involves exclusively SPs, then, the rule is as follows: the event at the head of the waiting list is executed if, and only if, its scheduled simulation time is equal to the current simulation time. However, a different rule is used if synchronization involves a real time network.

Integration of the Simulated Network with a Real Network

Referring back to FIG. 1, the RSNI 48 operates to bridge the differences between the simulated and real network environments by transforming the packet formats utilized over the simulation ring to real packets recognizable by the physical network, and vice-versa.

Figure 10:
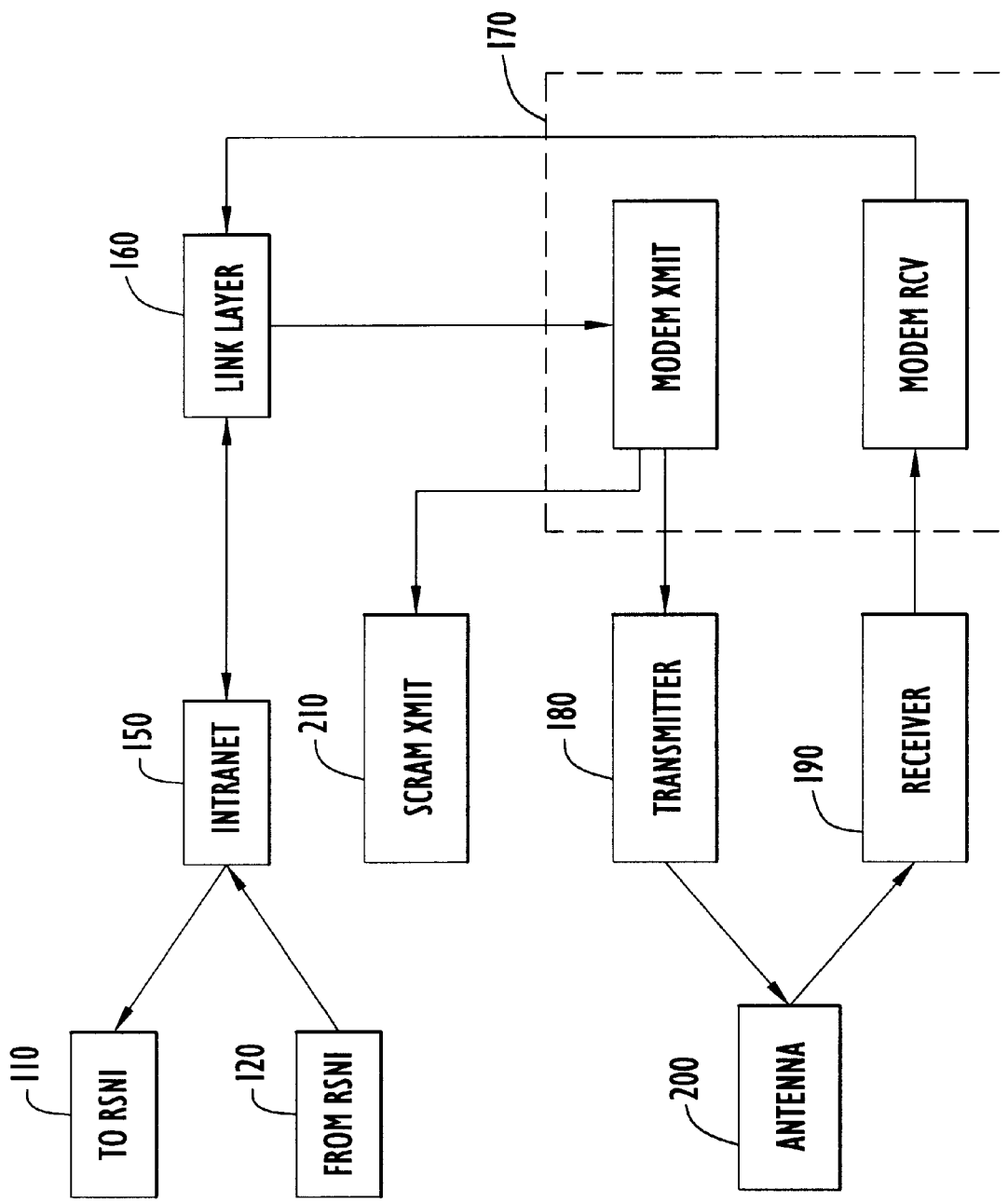
FIG. 10 is an RSNI interface node model within a designated subsystem platform according to the present invention.

Every RSNI 48 is associated with a designated SP 24 which, in addition to the discussed models, hosts an "RSNI interface node" 100 as shown in FIG. 10. The latter model differs from the active node one in that the IP and higher layer modules are replaced by two new modules: a "to RSNI" module 110 and a "from RSNI" module 120. These modules serve SCRAMNet packet sending and receiving, respectively.

Referring now to FIG. 1 in conjunction with FIG. 10, the operation of the RSNI interface node is as follows. Assume that SP k 24 serves as a designated SP for RSNI I (where I=1,2, . . . ,M) and that one of the active nodes, j, of SP k sends out a packet. Then, as previously discussed, this packet is transmitted to all other active nodes of SP k plus all proxies of node j in the rest of the SPs. However, this particular packet is, also, received by the RSNI interface node model of the SP resident in station k which, in turn, proceeds to transmit this packet to the respective RSNI. Upon reception, the RSNI 48 performs the required transformations and sends the packet to its directly attached real node 42 on physical network 40. Subsequently, this latter node 42 forwards the received packet to the rest of the nodes (43, 45, 47, 49) of the physical network 40.

Synchronization of Simulated and Real-Time Events

Synchronization between real-time events (occurring in the physical network) and simulated events at the SPs, requires that the determination involved in module 110 of FIG. 9 be made on the basis of a real time clock. Otherwise the synchronization process at the system controller 100 remains identical to the one applying to SPs 24. Accordingly, since real-time events cannot "wait", it is required that simulated events (at the SPs) run faster than events occurring in the real network. Otherwise, integration of simulated and real networks cannot be accomplished.

Let $T_{sim}$ be the current simulation time, $T_{real}$ the real time, and $T_{ev}$ the scheduled simulation time for the event currently at the head of the waiting list. Then, the decision making process, in module 110, at the synchronizer is as follows:

Step 1 if $T_{ev}$ equals $T_{sim}$ go to Step 2; else, go to Step 5

Step 2 if $T_{ev} < T_{real}$, go to Step 4; else, continue

Step 3 if $(T_{ev}-T_{real}) \leq \Delta T_{tol}$, where $\Delta T_{tol}$ represents the allowable tolerance for execution of an event ahead of the real time clock without causing unacceptable errors in the simulation results, go to Step 4; else, wait until $(T_{ey}-T_{real}) \leq \Delta T_{tol}$ is satisfied and then go to Step 4

Step 4 decision: the event at the head of the waiting list can be executed

Step 5 decision: the event at the head of the waiting list cannot be executed.

The above-described technique applies to all networks that allow (wholly or partially) any-node-to-any-node communication). Such networks include cellular and PCS (Personal Communication Systems) networks, among others. The achieved speedup is maximized for mobile, self-organizing networks; where clustering associations change constantly and each node must be tracking its neighbors dynamically.

The modeling approach described herein provides significant speedup for other applications, beyond networks. That is, other self-organizing physical systems such as atomic, molecular, and star-constellation systems may also benefit from the implementation of this distributed discrete event simulation system.

CALCULATION OF ACHIEVABLE SPEEDUP

The following indicates an approximation of the potential speedup that can be achieved through the described distributed simulation model. For generality purposes, the following parameters are assumed:

A seven-layer protocol stack; where each layer requires processing time t, when executed in a unistation (Note this is a pessimistic assumption, considering that, generally, physical layer functions take longer than those associated with each of the other layers and the fact that the number of layers is often five or six)

A total of n network nodes

A total of N simulating stations (SPs)

An aggregate overhead of T per user-packet transmission and reception

Then, the ratio between the time taken for simulation of the tasks associated with communication of a single user packet in a single workstation, and the time taken when the same tasks are executed on N workstations, is:

$$\{\{6t+[4(n-1)t]\}/N+T\}/[6t+4(n-1)t] \qquad (1)$$

where multiplier "4" stems from the fact that a single user packet communication requires in the case of NTDR transmission of four distinct packets between the nodes involved in the said communication.

Experimental results on the current system indicate for T an upper bound of 15t. Then, substituting 15t for T we obtain for expression (1):

$$[21+(4n-4)/N]/(6+4n-4)=21/(4n+1)+(1/N)[(4n-4)/(4n+2)] \qquad (2)$$

Considering that in large-scale networks, n is a relatively large number (for example, 1000) and, therefore, 4n>>4, the following is obtained:

$$21/(4n)+(4n)/[N(4n)]=21/(4n)+1/N \qquad (3)$$

Considering, again, that 4n>>1 (and hence $21/(4n) \rightarrow 0$), then the simplified expression becomes:

$$1/N \qquad (4)$$

The above ratio, as defined, represents the inverse of the speedup factor, S. Thus, it may be concluded that:

$$S \approx N \qquad (5)$$

where N is the number of simulating workstations in the distributed simulation system.

Measurements

Extensive measurements have been performed on a two-station distributed simulation system, running network models of up to 160 nodes, in order to verify that: (a) the generated simulation results are close to those obtained in a unistation environment, and (b) the speedup factor increases with the number of network nodes and, in fact, approaches the value of N.

The obtained verification results are, in summary, as follows:
- the delta between end-to-end delays measured on networks having sizes from 20 to 160 nodes is less than 1.2%
- the delta between packet completion rates measured on networks having sizes from 20 to 160 nodes is less than 0.35%

These results are within the range of statistical uncertainties encountered in a simulation environment and demonstrate the accuracy of our distributed simulation system.

Measurements of the speedup factor, S, show that S does indeed increase with the size of the simulated network; approaching, for large-scale networks, the value of N. For the 160-node network, S reached the value of 1.62. For large-scale, say 1000-node networks, S is expected to be very close to 2 in the specific case of the two-station system.

While there has been shown and described the preferred embodiments of the invention, other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention.

What is claimed is:

1. A distributed discrete-event simulation system operable for processing time-stamped events in chronological order for simulating a multinode communications network, said simulation system comprising:

a plurality of simulating platforms (SPs) operable for transmitting message packets to other said SPs for simulating node to node communications, each of said SPs simulating operation of a plurality of nodes within the communications network; and a system controller coupled via a communication medium to said plurality of SPs for controlling synchronization and message packet processing associated with said plurality of SPs;

wherein, when said system controller instructs an SP to initiate a time-stamped event requiring multiple tasks to be performed, said SP responds to said time-stamped event by triggering execution of tasks associated with said time-stamped event in said other SPs via said message packets to provide parallel task processing for said particular time-stamped event among said plurality of SPs.

2. The system according to claim 1, wherein each said simulating platform comprises a work station.

3. The system according to claim 2, wherein each said simulating platform (SP) further comprises:

a generator for generating said data packets for traversing TCP/IP layers for transmission from said SP;

transmission means responsive to said generator for transmitting outgoing packets over said communication medium of said simulation network; and an SP synchronizer for processing events associated with the SP at the appropriate simulated time.

4. The system according to claim 3, wherein said SP synchronizer of each respective SP includes:

means for identifying the next event to be executed by the respective SP;

means for inserting a synchronization event into an SP simulation event list;

means for transmitting a message packet containing information indicative of said next event scheduled at the respective SP to the system controller; and execution means for executing commands and processing the information received from said system controller and said other SPs.

5. The system according to claim 4, wherein the simulated network is partitioned such that each SP includes $n_k$ active nodes for initiating packet transmission and $n-n_k$ proxy nodes operable as repeaters for said message packet transmission.

6. The system according to claim 5, wherein said system controller further includes a system control synchronizer for maintaining a waiting list containing events to be processed by said plurality of SPs and an execution list containing events currently being processed by said SPs.

7. The system according to claim 6, wherein said system controller further includes:

a receiver for receiving message packets including information on the event to be executed next at each SP;

a scheduler for ordering of event information received from each SP and for determining which event to be next processed; and a transmitter for notifying each respective SP to process the next event scheduled on the respective event list.

8. The system according to claim 7, wherein said system controller is operable to set the current simulation time to the simulation time associated with a particular event currently at the head of the execution list.

9. The system according to claim 8, wherein said system controller operates to permit execution of an event at said plurality of SPs when the scheduled simulation time of said event equals the current simulation time.

10. The system according to claim 7, further comprising a network interface module coupled to said plurality of SPs and said system controller for transforming said message packets transmitted over said simulation network into real packets for transmission over a physical network.

11. The system according to claim 10, wherein said network interface module is associated with a particular one of said plurality of said SPs for performing said transformation of said data packet formats.

12. The system according to claim 11, wherein each said SP further includes a Real/Simulated Network Interface (RSNI) node comprising a first module for receiving data packets sent from said network interface module and a second module for transmitting data packets to said network interface module.

13. The method according to claim 12, wherein said plurality of SPs each include a simulated time clock and wherein said system controller includes a real time clock and simulated time clock.

14. The system according to claim 13, wherein said system controller operates to synchronize between real time events occurring in the physical network and simulated events occurring at said SPs via said real time clock.

15. The system according to claim 14, wherein said system controller operates to permit execution of an event at an SP when the scheduled simulation time equals the current simulation time and the event time is less than or within a predetermined time increment of said real time.

16. A method for processing time-stamped events in chronological order for simulating a multinode communications network, said method comprising the steps of:

assigning to each of a plurality of simulating platforms (SPs) a subset of active nodes for originating and transmitting message packets to other said nodes, and proxy nodes operable as repeaters of said transmitted message packets for simulated multinode communications;

controlling synchronization of message processing associated with said SPs via a system controller coupled to said SPs;

receiving a time-stamped event for execution by one of said SPs; and triggering execution of tasks associated with said time-stamped event in other SPs via message packets from said active and proxy nodes and performing parallel task processing for said particular time-stamped event among said plurality of SPs.

17. The method according to claim 16, further comprising synchronizing events for processing by each said SP.

18. The method according to claim 17, wherein the step of synchronizing at each respective SP further comprises:

identifying the event to be executed next at said respective SP;

inserting a synchronization event into said respective SP's simulation event list; and transmitting information indicative of the next event scheduled for processing at said respective SP to the system controller.

19. The method according to claim 18, wherein the step of synchronizing further comprises:

examining an incoming message buffer for message packets;

when said incoming message buffer is not empty, retrieving the oldest message from said buffer; determining the type of command contained within a header portion of said retrieved message;

scheduling a packet for transmission and sending updated information for the next event to be processed to the system controller upon detection of a transmit command type; and inserting a synchronization event behind the next event; and releasing control back to a kernel of said system controller.

20. The method according to claim 18, further comprising:

synchronizing said SPs with said system controller by preparing a waiting list of n events for simulation;

sampling an incoming message buffer for message packets, retrieving the oldest message from said message buffer, and determining the command type and SP identifier associated with said message;

changing the simulation time of all events currently in the waiting list to the current simulation time and moving said event to an execution list upon determination of a transmit packet command type; and removing the event associated with the SP with the sending SP from the execution list and determining if the event at the head of the waiting list is to be executed.

21. The method according to claim 20, further including the steps of:

inserting the event embedded in the received message in the execution list if the command type is an update execution event command; and inserting the event embedded in the waiting list and updating the current simulation time if the command type is SP-NEXT-EV command.

22. The method according to claim 21, wherein the step of determining if the event at the head of the waiting list should be executed further comprises determining if the scheduled simulation time of the scheduled event is equal to the current simulation time.

23. The method according to claim 20, further comprising transforming packet formats associated with said message packets utilized over the simulation network into real packets recognizable by a physical network.

24. The method according to claim 23, wherein the step of determining if the event at the head of the waiting list should be executed comprises:

determining the scheduled simulation time of the event;

determining the current simulation time;

determining the real time associated with the physical network;

determining if the scheduled simulation time equals the current simulation time; and determining whether the event time is less than or within a predetermined interval of said real time.

25. A simulation system for simulating events occurring in a multi-node system having n nodes, wherein simulation of each of certain events involves a plurality of said n nodes performing tasks in parallel, the simulation system comprising:

a plurality of simulating platforms among which the n nodes are partitioned such that each simulating platform represents a plurality of the n nodes as active nodes and represents all remaining nodes of the n nodes as proxy nodes acting as representatives of active nodes residing on other simulating platforms, wherein each of the n nodes is represented as an active node on one of the simulating platforms and is represented as a proxy node on all others of the simulating platforms;

each of said simulating platforms simulating operation of its active nodes by simulating events initiated by its active nodes and by performing event tasks associated with its active nodes, wherein, when a simulation event initiated by a first node that is an active node on a first simulating platform requires a task to be performed by a second node that is an active node on a second simulating platform, the first node transmits a message to the proxy node representing the first node on the second simulating platform, and the corresponding proxy node transmits a message to the second active node to initiate execution of the task, whereby plural tasks associated with the simulation event are performed in parallel on plural simulating platforms.

26. The simulation system of claim 25, wherein:

one of said simulating platforms comprises a simulation controller for synchronizing execution of simulation events among said simulating platforms;

each simulating platform maintains an event list and informs said simulation controller when ready to execute a next event on the event list; and said simulation controller instructs each simulating platform as to when to execute the next event.

27. The simulation system of claim 25, wherein an active node within a simulating platform communicates messages directly to other active nodes within the simulating platform and to proxy nodes corresponding to said active node in other simulating platforms, said proxy nodes serving as repeaters to communicate messages from said active node to active nodes within said other simulating platforms.

28. The simulation system of claim 25, wherein the simulating platforms are interconnected in a ring architecture.

29. The simulation system of claim 25, wherein said simulating platforms communicate using a shared-memory approach for message transmission.

30. The simulation system of claim 25, wherein the simulation system interfaces with a network of real nodes.

31. The system of claim 25, wherein simulation events correspond to communication of message packets.

32. The system of claim 31, wherein simulation events include tasks associated with simulating communication using a protocol of an open systems interconnection (OSI) layered architecture.

33. The system of claim 25, wherein each simulating platform comprises a workstation.

34. A method of simulating events occurring in a multi-node system having n nodes, the method comprising the steps of:

(a) partitioning the n nodes among a plurality of simulating platforms by assigning each node to a particular simulating platform, such that each simulating platform is responsible for performing event tasks associated with a plurality of nodes comprising a subset of the n nodes;

(b) instructing one of the simulating platforms to initiate a simulation event, wherein the simulation event requires a plurality of tasks to be performed by a plurality of particular nodes residing on said one of the simulating platforms and on others of the simulating platforms; and (c) distributing the tasks of the simulation event among the simulating platforms in accordance with the particular nodes associated with the plurality of tasks and the assignment of nodes to particular simulating platforms, thereby permitting the plurality of tasks of the simulation event to be processed in parallel on plural simulating platforms.

35. The method of claim 34, further comprising the steps of:

(d) maintaining an event list in each of the simulating platforms;

(e) informing a simulation controller when a simulating platform ready to execute a next event on the event list; and (f) instructing each simulating platform as to when to execute the next event, thereby synchronizing execution of simulation events among the simulating platforms.

36. The method of claim 34, wherein when an initiated event corresponds to a certain node assigned to a certain simulating platform, step (c) includes:

(c1) transmitting a message directly from the certain node to other nodes assigned to the certain simulating platform that correspond to tasks of the simulation event;

(c2) transmitting a message from the certain node to a repeater within other simulating platforms having active nodes corresponding to tasks of the simulation event; and (c3) transmitting a message from the repeater to the active nodes within each respective simulating platform that correspond to tasks of the simulation event.

* * * * *